United States Patent
Parkhomenko et al.

(10) Patent No.: US 9,384,411 B2
(45) Date of Patent: Jul. 5, 2016

(54) IMAGE PROCESSOR WITH EDGE-PRESERVING NOISE SUPPRESSION FUNCTIONALITY

(71) Applicant: LSI Corporation, San Jose, CA (US)

(72) Inventors: Denis V. Parkhomenko, Moscow (RU);
Denis V. Parfenov, Moscow (RU); Denis V. Zaytsev, Moscow (RU); Aleksey A. Letunovskiy, Moscow (RU); Dmitry N. Babin, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 258 days.

(21) Appl. No.: 14/238,104

(22) PCT Filed: Aug. 28, 2013

(86) PCT No.: PCT/US2013/056937
§ 371 (c)(1),
(2) Date: Feb. 10, 2014

(87) PCT Pub. No.: WO2014/123584
PCT Pub. Date: Aug. 14, 2014

(65) Prior Publication Data
US 2016/0026889 A1    Jan. 28, 2016

(30) Foreign Application Priority Data
Feb. 5, 2013   (RU) .................................. 2013104894

(51) Int. Cl.
*G06K 9/40*     (2006.01)
*G06K 9/46*     (2006.01)
(Continued)

(52) U.S. Cl.
CPC .. *G06K 9/40* (2013.01); *G06K 9/44* (2013.01);
*G06K 9/4604* (2013.01); *G06K 9/6212* (2013.01); *G06K 9/6218* (2013.01);
(Continued)

(58) Field of Classification Search
None
See application file for complete search history.

(56) References Cited

U.S. PATENT DOCUMENTS 5,850,294 A * 12/1998 Apostolopoulos ..... H04N 19/86
                                                   358/426.14
5,883,983 A *  3/1999 Lee ........................... G06T 5/20
                                                     375/E7.19
(Continued)

FOREIGN PATENT DOCUMENTS

EP         1337938 B1   3/2010
WO  PCT/US2013/056937   2/2014

OTHER PUBLICATIONS

Deng et al., "An Adaptive Gaussian Filter for Noise Reduction and Edge Detection", IEEE Publication, 1994, pp. 1415-1619.*

(Continued)

*Primary Examiner* — Brian P Werner (57) ABSTRACT

An image processing system comprises an image processor configured to identify edges in an image, to apply a first type of filtering operation to portions of the image associated with the edges, and to apply a second type of filtering operation to one or more other portions of the image. By way of example only, in a given embodiment a clustering operation is applied to the image to identify a plurality of clusters, a first set of edges comprising edges of the clusters is identified, an edge detection operation is applied to the image to identify a second set of edges, a third set of edges is identified based on the first and second sets of edges, and the first type of filtering operation is applied to portions of the image associated with one or more edges of the third set of edges.

20 Claims, 6 Drawing Sheets

(51) Int. Cl.
 *G06K 9/44* (2006.01)
 *G06K 9/62* (2006.01)
 *G06T 5/00* (2006.01)
 *G06T 5/20* (2006.01)
 *G06T 7/00* (2006.01)

(52) U.S. Cl.
 CPC ............... *G06T 5/002* (2013.01); *G06T 5/20* (2013.01); *G06T 7/0085* (2013.01); *G06T 2207/10028* (2013.01); *G06T 2207/20192* (2013.01)

(56) References Cited

U.S. PATENT DOCUMENTS

| | | | |
|---|---|---|---|
| 6,226,050 B1* | 5/2001 | Lee | H04N 5/21 348/607 |
| 7,003,173 B2* | 2/2006 | Deshpande | G06T 7/0083 348/E5.076 |
| 2006/0181740 A1* | 8/2006 | Kim | H04N 19/176 358/3.26 |
| 2007/0076972 A1* | 4/2007 | Chiu | H04N 19/61 382/261 |
| 2008/0239153 A1 | 10/2008 | Chiu | |
| 2009/0175537 A1 | 7/2009 | Tribelhorn et al. | |
| 2010/0091880 A1* | 4/2010 | Jia | H04N 19/44 375/240.25 |
| 2011/0123121 A1* | 5/2011 | Springer | H04N 19/176 382/199 |
| 2011/0188773 A1* | 8/2011 | Wei | G06K 9/40 382/260 |
| 2012/0082219 A1* | 4/2012 | Sun | H04N 7/26058 375/240.12 |
| 2012/0105585 A1 | 5/2012 | Masalkar et al. | |

OTHER PUBLICATIONS

Ashidi et al., "Automated Edge Detection Technique for Pap Smear Images Using Moving K-Means Clustering and Modified Seed Based Region Growing Algorithm", International Journal of the Computer, the Internet and Management vol. 13.No. 3 (Sep.-Dec. 2005) pp. 45-59.*

John Canny, "A Computational Approach to Edge Detection," IEEE Transactions on Pattern Analysis and Machine Intelligence, Nov. 1986, pp. 679-698, vol. 8, No. 6.

R. Kimmel et al., "On Regularized Laplacian Zero Crossings and Other Optimal Edge Integrators," International Journal of Computer Vision, Jan. 2003, pp. 225-243, vol. 53, No. 3.

William K. Pratt, "Digital Image Processing," PIKS Inside, Third Edition, 2001, 738 pages.

Y. Yue et al., "Nonlinear Multiscale Wavelet Diffusion for Speckle Suppression and Edge Enhancement in Ultrasound Images," IEEE Transactions on Medical Imaging, Mar. 2006, pp. 297-311, vol. 25, No. 3.

M. Karaman et al., "An Adaptive Speckle Suppression Filter for Medical Ultrasonic Imaging," IEEE Transactions on Medical Imaging, Jun. 1995, pp. 283-292, vol. 14, No. 2.

P. Lai et al., "Depth Map Processsing with Iterative Joint Multilateral Filtering," IEEE Proceedings of the 28th Picture Coding Symposium (PCS), Dec. 2010, pp. 9-12, Naoya, Japan.

F. Sattar et al., "Image Enhancement Based on a Nonlinear Multiscale Method," IEEE Transactions on Image Processing, Jun. 1997, pp. 888-895, vol. 6, No. 6.

R. Nock et al., "Statistical Region Merging," IEEE Transactions on Pattern Analysis and Machine Intelligence, Nov. 2004, pp. 1452-1458, vol. 26, No. 11.

* cited by examiner

IMAGE PROCESSOR WITH EDGE-PRESERVING NOISE SUPPRESSION FUNCTIONALITY

FIELD

The field relates generally to image processing, and more particularly to techniques for reducing or otherwise suppressing noise in one or more images.

BACKGROUND

It is often desirable to reduce or otherwise suppress noise in an image. Examples of conventional noise suppression techniques include spatial filtering operations such as Gaussian smoothing, non-linear filtering operations such as median smoothing, and adaptive filtering operations such as Weiner filtering. Such techniques generally produce acceptable results when applied to high-resolution images, such as photographs or other two-dimensional (2D) images produced by a digital camera. However, many important machine vision applications utilize three-dimensional (3D) images generated by depth imagers such as structured light (SL) cameras or time of flight (ToF) cameras. These depth images are often low-resolution images and typically include highly noisy and blurred edges. Application of conventional noise suppression techniques to depth images and other types of low-resolution images can further degrade the quality of the edges present in the images. This can undermine the effectiveness of subsequent image processing operations such as feature extraction, pattern identification, gesture recognition, object recognition and tracking.

SUMMARY

In one embodiment, an image processing system comprises an image processor configured to identify edges in an image, to apply a first type of filtering operation to portions of the image associated with the edges, and to apply a second type of filtering operation to one or more other portions of the image.

By way of example only, in a given embodiment a clustering operation is applied to the image to identify a plurality of clusters, a first set of edges comprising edges of the clusters is identified, an edge detection operation is applied to the image to identify a second set of edges, a third set of edges is identified based on the first and second sets of edges, and the first type of filtering operation is applied to portions of the image associated with one or more edges of the third set of edges.

Other embodiments of the invention include but are not limited to methods, apparatus, systems, processing devices, integrated circuits, and computer-readable storage media having computer program code embodied therein.

DETAILED DESCRIPTION

Embodiments of the invention will be illustrated herein in conjunction with exemplary image processing systems that include image processors or other types of processing devices and implement techniques for reducing or otherwise suppressing noise in a given image while also preserving edges in that image. It should be understood, however, that embodiments of the invention are more generally applicable to any image processing system or associated device or technique that involves processing of one or more images in order to suppress noise while preserving edges.

Figure 1:
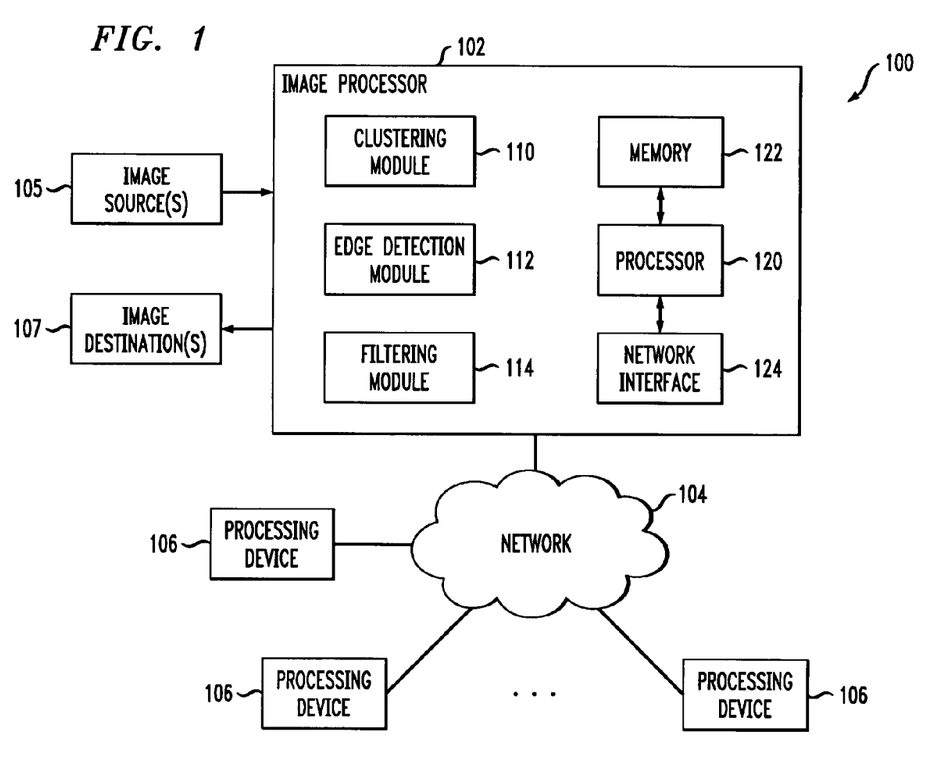
FIG. 1 is a block diagram of an image processing system comprising an image processor with edge-preserving noise suppression functionality in one embodiment.

FIG. 1 shows an image processing system 100 in an embodiment of the invention. The image processing system 100 comprises an image processor 102 that receives images from one or more image sources 105 and provides processed images to one or more image destinations 107. The image processor 102 also communicates over a network 104 with a plurality of processing devices 106.

Although the image source(s) 105 and image destination(s) 107 are shown as being separate from the processing devices 106 in FIG. 1, at least a subset of such sources and destinations may be implemented as least in part utilizing one or more of the processing devices 106. Accordingly, images may be provided to the image processor 102 over network 104 for processing from one or more of the processing devices 106. Similarly, processed images may be delivered by the image processor 102 over network 104 to one or more of the processing devices 106. Such processing devices may therefore be viewed as examples of image sources or image destinations.

A given image source may comprise, for example, a 3D imager such as an SL camera or a ToF camera configured to generate depth images, or a 2D imager configured to generate grayscale images, color images, infrared images or other types of 2D images. Another example of an image source is a storage device or server that provides images to the image processor 102 for processing.

A given image destination may comprise, for example, one or more display screens of a human-machine interface of a computer or mobile phone, or at least one storage device or server that receives processed images from the image processor 102.

Also, although the image source(s) 105 and image destination(s) 107 are shown as being separate from the image processor 102 in FIG. 1, the image processor 102 may be at least partially combined with at least a subset of the one or more image sources and the one or more image destinations on a common processing device. Thus, for example, a given image source and the image processor 102 may be collectively implemented on the same processing device. Similarly, a given image destination and the image processor 102 may be collectively implemented on the same processing device.

In the present embodiment, the image processor 102 is configured to identify edges in an image, to apply a first type of filtering operation to portions of the image associated with the edges, and to apply a second type of filtering operation to one or more other portions of the image. More particularly, in the present embodiment, a clustering operation is applied to the image to identify a plurality of clusters, and a first set of edges comprising edges of the clusters is identified. In addition, an edge detection operation is applied to the image to identify a second set of edges, and a third set of edges is identified based on the first and second sets of edges. The first type of filtering operation is applied to portions of the image associated with one or more edges of the third set of edges. The portions of the image associated with respective edges may comprise, for example, sets of edge pixels that form the respective edges.

The image processor 102 as illustrated in FIG. 1 includes a clustering module 110, an edge detection module 112 and a filtering module 114. The clustering module 110 is configured to identify a plurality of clusters in the image. Edges of these clusters are identified as the above-noted first set of edges. The edge detection module 112 is configured to identify the above-noted second set of edges in the image. The filtering module 114 is configured to separately apply the first and second filtering operations to the corresponding portions of the image.

The term "image" in this context and other contexts herein is used in a very general sense, and application of various operations to an image or portions thereof should be understood to encompass application of such operations to related images, such as filtered or otherwise preprocessed versions of a given input image or other types of related versions of a given input image.

The image in given embodiment may comprise a depth image generated by a depth imager such as an SL camera or a ToF camera. The various sets of edges may be in the form of respective edge maps or other types of edge images. These edge images are considered examples of related versions of the corresponding image from which they are derived. Other types and arrangements of images and associated edge information may be received, processed and generated in other embodiments.

The particular number and arrangement of modules shown in image processor 102 in the FIG. 1 embodiment can be varied in other embodiments. For example, in other embodiments two or more of these modules may be combined into a lesser number of modules. An otherwise conventional image processing integrated circuit or other type of image processing circuitry suitably modified to perform processing operations as disclosed herein may be used to implement at least a portion of one or more of the modules 110, 112 and 114 of image processor 102.

The operation of the image processor 102 and its modules 110, 112 and 114 will be described in greater detail below in conjunction with the flow diagrams of FIGS. 2 through 6. Each of these flow diagrams is associated with an exemplary process for edge-preserving noise suppression implemented using modules 110, 112 and 114. Another exemplary process for edge-preserving noise suppression using sliding vicinities will be described below in conjunction with FIG. 7.

A resulting output image from a given edge-preserving noise suppression process implemented by the image processor 102 may be subject to additional processing operations in the image processor 102, such as, for example, feature extraction, pattern identification, gesture recognition, object recognition and tracking.

Alternatively, the resulting output image generated by the image processor 102 may be provided to one or more of the processing devices 106 over the network 104. One or more such processing devices may comprise respective image processors configured to perform the above-noted subsequent operations such as feature extraction, pattern identification, gesture recognition, object recognition and tracking.

The processing devices 106 may comprise, for example, computers, mobile phones, servers or storage devices, in any combination. One or more such devices also may include, for example, display screens or other user interfaces that are utilized to present images generated by the image processor 102. The processing devices 106 may therefore comprise a wide variety of different destination devices that receive processed image streams from the image processor 102 over the network 104, including by way of example at least one server or storage device that receives one or more processed image streams from the image processor 102.

Although shown as being separate from the processing devices 106 in the present embodiment, the image processor 102 may be at least partially combined with one or more of the processing devices 106. Thus, for example, the image processor 102 may be implemented at least in part using a given one of the processing devices 106. By way of example, a computer or mobile phone may be configured to incorporate the image processor 102 and possibly a given image source. The image source(s) 105 may therefore comprise cameras or other imagers associated with a computer, mobile phone or other processing device. As indicated previously, the image processor 102 may be at least partially combined with one or more image sources or image destinations on a common processing device.

The image processor 102 in the present embodiment is assumed to be implemented using at least one processing device and comprises a processor 120 coupled to a memory 122. The processor 120 executes software code stored in the memory 122 in order to control the performance of image processing operations. The image processor 102 also comprises a network interface 124 that supports communication over network 104.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The memory 122 stores software code for execution by the processor 120 in implementing portions of the functionality of image processor 102, such as portions of modules 110, 112 and 114. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. As indicated above, the processor may comprise portions or combinations of a microprocessor, ASIC, FPGA, CPU, ALU, DSP or other image processing circuitry.

It should also be appreciated that embodiments of the invention may be implemented in the form of integrated circuits. In a given such integrated circuit implementation, identical die are typically formed in a repeated pattern on a surface of a semiconductor wafer. Each die includes an image processor or other image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

For example, in some embodiments, the image processing system 100 is implemented as a video gaming system or other type of gesture-based system that processes image streams in order to recognize user gestures. The disclosed techniques can be similarly adapted for use in a wide variety of other systems requiring a gesture-based human-machine interface, and can also be applied to applications other than gesture recognition, such as machine vision systems in robotics and other industrial applications.

Figure 2:
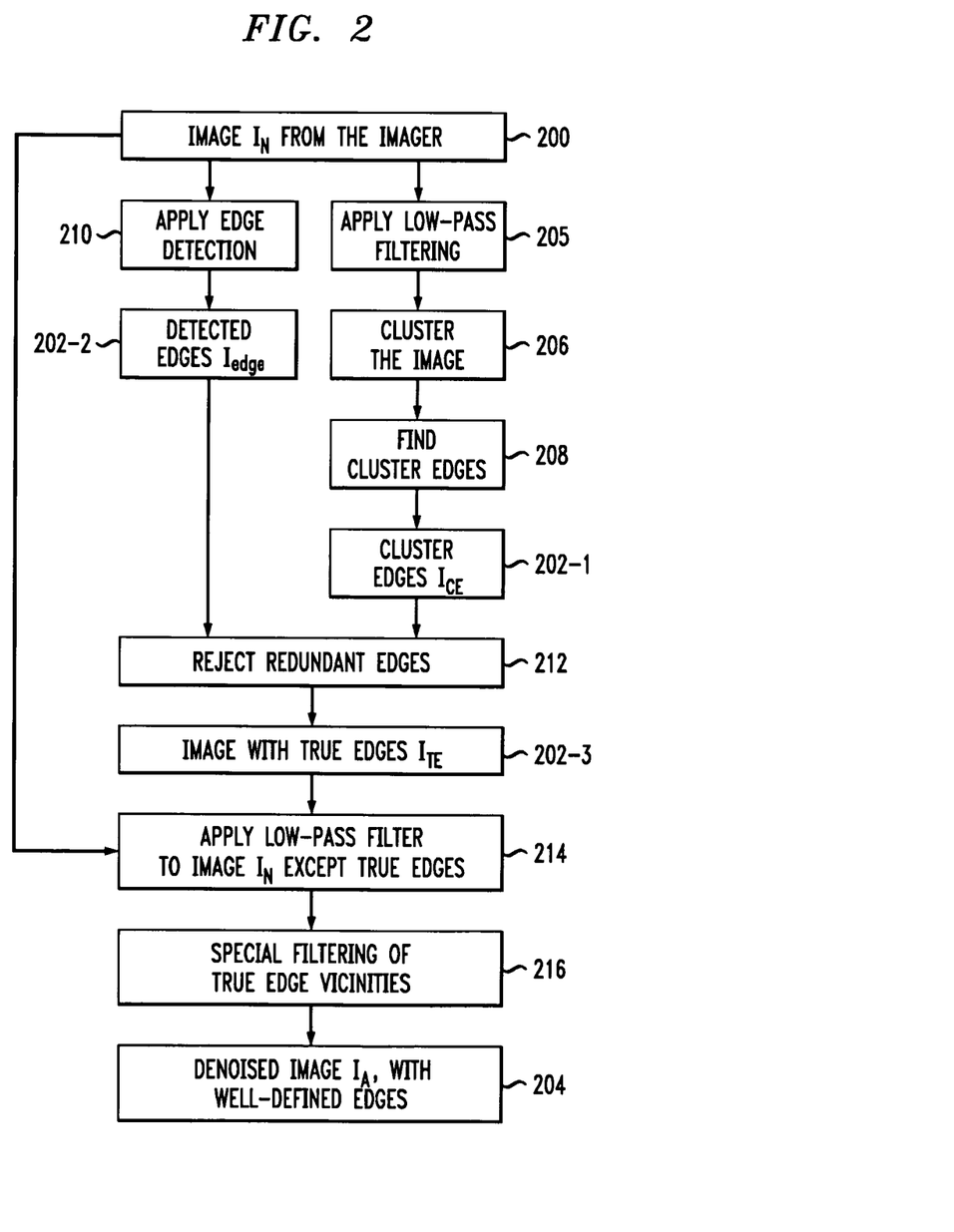
FIG. 2 is a flow diagram of an exemplary process for edge-preserving noise suppression using the image processor of the FIG. 1 system.

Referring now to FIG. 2, an exemplary process is shown for edge-preserving noise suppression in the image processing system 100 of FIG. 1. The FIG. 2 process is assumed to be implemented by the image processor 102 using its clustering module 110, edge detection module 112 and filtering module 114. The process in this embodiment begins with a noisy input image $I_N$ from an image source 105 comprising an imager, as indicated at block 200. It is assumed in this embodiment that the noisy input image more particularly comprises a depth map or other depth image from a depth imager. The noisy input image is also assumed to be a grayscale image, although the disclosed techniques can be adapted in a straightforward manner to other types of images, including color images.

The process produces additional related images $I_{CE}$, $I_{edge}$ and $I_T$ as indicated at blocks 202-1, 202-2 and 202-3, respectively, as well as an output image comprising a denoised image $I_A$ with well-defined edges as indicated at block 204. The related images $I_{CE}$, $I_{edge}$ and $I_{TE}$ as indicated at blocks 202-1, 202-2 and 202-3 may be in the form of respective edge maps or other types of edge images, and may be viewed as examples of what are more generally referred to herein as the above-noted first, second and third sets of edges, respectively. It is assumed that each of the input image $I_N$ and the related images $I_{CE}$, $I_{edge}$ and $I_{TE}$ is in the form of a rectangular m-by-n matrix of real numbers. Thus, all of the images $I_N$, $I_{CE}$, $I_{edge}$ and $I_{TE}$ in the present embodiment are assumed to have the same size or resolution in pixels.

The process includes steps 205, 206, 208, 210, 212, 214 and 216. The goal of the process is to produce the denoised image $I_A$ such that it exhibits significantly improved image quality relative to the noisy input image $I_N$ in terms of signal-to-noise ratio (SNR), peak SNR (PSNR) or other measures, such as various figures of merit.

In step 205, a low-pass filtering operation is applied to the noisy input image $I_N$. This low-pass filtering operation is used to eliminate high-frequency noise, and is an example of what is more generally referred to herein as a preprocessing operation. Other types of preprocessing operations may be applied in other embodiments. Elimination of high-frequency noise is advantageous in some embodiments as the subsequent clustering operations can be sensitive to such noise.

The low-pass filtering operation applied in step 205 does not deteriorate edges in the output denoised image $I_A$ because the low-pass filtered input image $I_N$ is used for subsequent clustering only. The type of low-pass filtering operation may vary as a function of the particular image processing application, and a wide variety of different types of linear or non-linear smoothing may be used. For example, Gaussian smoothing with sigma=0.66 and Gaussian approximation size=5 may be used.

Figure 3:
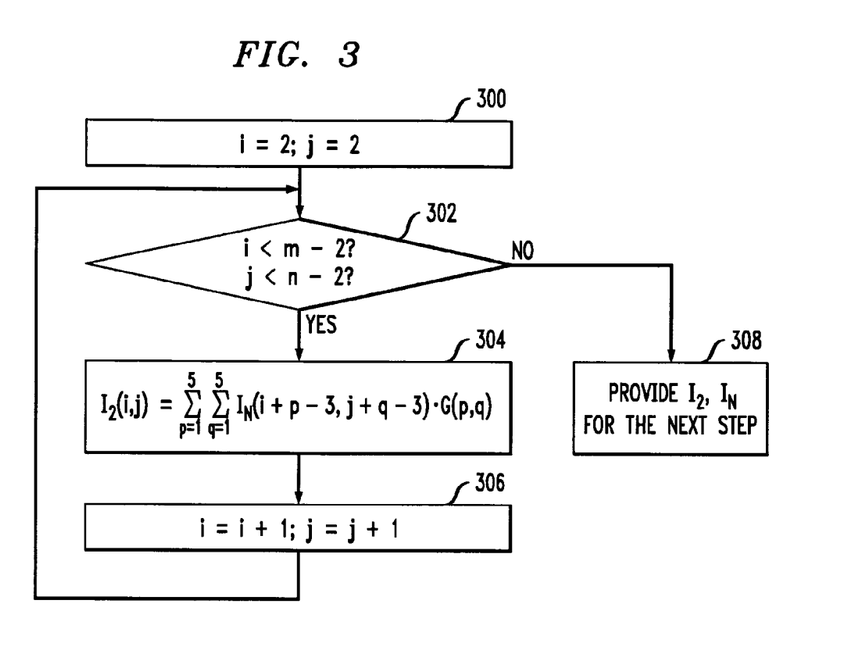
FIGS. 3 through 6 are flow diagrams illustrating respective portions of the FIG. 2 process.

This type of low-pass filtering is illustrated in the flow diagram of FIG. 3, which includes steps 300 through 308. The matrix $G=\{g_{pq}\}$ is a Gaussian approximation, where in this example, with Gaussian approximation size=5, the indices p,q=1, 2, . . . , 5. Step 300 initializes the image pixel indices i and j, and step 302 compares their current values to the image dimensions m and n. In this flow diagram, $I_2$ denotes the low-pass filtered image that is subject to subsequent clustering. Step 304 determines a particular filtered image pixel (i,j) based on the Gaussian approximation. Step 306 increments i and j after which the process returns to step 302. Finally, step 308 indicates that the low-pass filtering is complete, and that low-pass filtered image $I_2$ and input image $I_N$ are available for the next step of the FIG. 2 process.

In step 206, the image as preprocessed in step 205 is clustered using at least one clustering operation. The clustering operation is implemented using the clustering module 110 of image processor 102. As noted above, the low-pass filtered image $I_2$ is considered a related version of input image $I_N$, and both may be referred to by the common term "image" as broadly used herein.

The clustering operation may involve generating a cluster map for the image. By way of example, a given cluster map for image $I_2$ representing a low-pass filtered version of input image $I_N$ may be defined in the following manner. Assume that the set of all pixels from image $I_2$ is segmented into non-intersecting subsets of pixels with each such subset representing a cluster. The cluster map in this case may be in the form of a matrix $C_m$ having the same size as image $I_2$. Element (i,j) from $C_m$ corresponds to the index of a particular cluster of $I_2$ to which the image pixel having coordinates (i,j) belongs. Other types of cluster maps may be used in other embodiments. The term "cluster map" as used herein is therefore intended to be broadly construed.

A variety of different clustering techniques may be used in implementing step 206. For example, one or more such techniques may be based on statistical region merging (SRM). Conventional aspects of SRM are disclosed in R. Nock and F. Nielsen, "Statistical region merging," IEEE Transactions on Pattern Analysis and Machine Intelligence, Vol. 26, No. 11, November 2004, which is incorporated by reference herein.

The clustering techniques in this embodiment generally attempt to ensure that the boundaries of the identified clusters include significant boundaries of corresponding objects in the imaged scene even if those objects may be located different distances from the imager, or may appear in different colors or with other differing characteristics.

SRM-based clustering techniques are generally resistant to random noise and have moderate computational complexity as well as good quantitative error bounds. Also, the degree of segmentation can be regulated in a manner that allows computational requirements to be dynamically controlled.

In a more particular example of an SRM-based clustering technique, each pixel of the image is represented by a family of independently distributed random variables relating to an optimal image, with the actual image being considered a particular observation of the optimal image. The actual and optimal images are each separated into optimal statistical regions using a homogeneity rule specifying that inside each statistical region pixels have the same expectation, and expectations of adjacent regions are different.

This exemplary SRM-based technique implements recursive merging using a specified merging predicate P. Let each pixel of $I_2$ be represented by Q random variables. Then merging predicate P for two arbitrary regions $R_1, R_2$ of $I_2$ can be expressed as follows:

$$P(R_1, R_2) = \begin{cases} \text{true,} & \text{if } |R_1 - R_2| \leq \sqrt{b^2(R_1) + b^2(R_2)}, \\ \text{false,} & \text{otherwise} \end{cases},$$

$$\text{where } b(R) = G\sqrt{\frac{1}{2Q|R|} \cdot \ln(|R|^{|R|}/\delta)}$$

where $|R|$ denotes the number of pixels in region R, G denotes the maximum possible value of a given pixel of $I_2$ (e.g., $G=2^{12}$ for an image from a Kinect image sensor), and $\delta$ is a positive value less than 1. Accordingly, $|R_1-R_2|$ denotes the magnitude of the difference between the number of pixels in region $R_1$ and the number of pixels in region $R_2$. This technique merges regions $R_1$ and $R_2$ into a single cluster if $P(R_1, R_2)$=true.

The technique starts at the pixel level, with every pixel initially being considered an individual region. The order in which the merging of regions is tested against the predicate P follows an invariant A which indicates that when any test between two parts of two different regions occurs, that means all tests inside these two regions have previously occurred. This invariant A can be achieved using a function $f(pix_1, pix_2)=|pix_1-pix_2|$, where $pix_i$ is an image pixel value.

The SRM-based technique then proceeds in the following manner. First, all possible pairs of pixels $(pix_1, pix_2)$ are sorted in increasing order of function $f(pix_1, pix_2)=|pix_1-pix_2|$, and the resulting order is traversed only once. For any current pair of pixels $(pix_1, pix_2)$ for which $R(pix_1) \neq R(pix_2)$, where R(pix) denotes the current region to which pix belongs, the test $P(R(pix_1), R(pix_2))$ is performed and $R(pix_1)$ and $R(pix_2)$ are merged if and only if the test returns true. At the completion of the merging process for the image, the image pixels have been separated into multiple clusters with the clusters being characterized by a cluster map of the type of described previously.

The function $f(pix_1, pix_2)=|pix_1-pix_2|$ is used in this embodiment as an approximation of the invariant A, although other functions can be used. Also, merging predicates and other parameters can be varied in the above-described SRM-based technique. Moreover, various clustering techniques not based on SRM may be used. It should also be noted in this regard that the clustering module 110 may implement several different clustering techniques that require different levels of computational resources and switch between those techniques based on the current computational load of the image processor 102.

In step 208, edges of the clusters are identified. As indicated above, the output of step 206 may be in the form of a cluster map. The cluster map is processed in step 208 to generate the related image $I_{CE}$ of block 202-1 where $I_{CE}$ comprises edges of the clusters. For example, the related image $I_{CE}$ may be generated such that $I_{CE}(i,j)=1$ if and only if a corresponding vicinity $O(i,j,1)$ having a one-pixel radius around the pixel with coordinates $(i,j)$ has pixels from different clusters, and otherwise $I_{CE}(i,j)=0$. Other techniques can be used for identifying the cluster edges in other embodiments.

Figure 4:
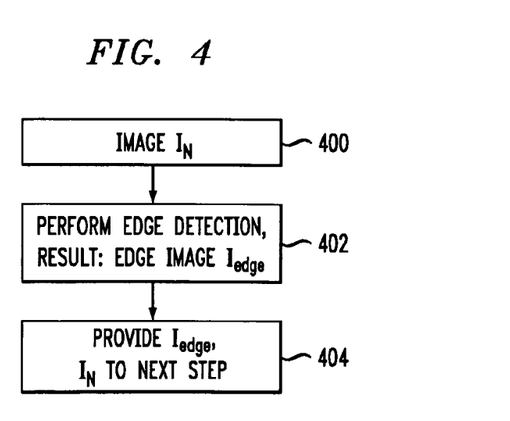

In step 210, which is assumed to be performed in parallel with steps 205, 206 and 208, an edge detection operation is applied to the noisy input image $I_N$ to generate related edge image $I_{edge}$ comprising a second set of edges. As noted above, the first set of edges in this embodiment comprises the cluster edges of edge image $I_{CE}$. The edge detection portion of the process is also illustrated in FIG. 4, which receives noisy input image $I_N$ as indicated by block 400, and performs edge detection in step 402 to obtain edge image $I_{edge}$. Finally, step 404 indicates that the edge detection is complete, and that edge image $I_{edge}$ and input image $I_N$ are available for the next step of the FIG. 2 process.

It may be assumed that the edge image $I_{edge}$ generated in step 402 of FIG. 4 satisfies the condition $I_{edge}(i,j)=I_N(i,j)$ if and only if the pixel with coordinates $(i,j)$ belongs to an edge, and otherwise $I_{edge}(ii)=0$. In other words, $I_{edge}$ comprises edges on a black or zero intensity background.

Any of a wide variety of known edge detection techniques may be applied to generate the edge image $I_{edge}$ in step 402. Examples of such edge detection techniques are disclosed in, for example, J. Canny, "A computational approach to edge detection," IEEE Transactions on Pattern Analysis and Machine Intelligence, Vol. PAMI-8, Issue 6, pp. 679-698, November 1986; R. Kimmel and A. M. Bruckstein, "On regularized Laplacian zero crossings and other optimal edge integrators," International Journal of Computer Vision, 53(3): 225-243, 2003; and W. K. Pratt, Digital Image Processing, $3^{rd}$ Edition, John Wiley & Sons, 2001, which are incorporated by reference herein.

In applying a given edge detection operation in step 402, any associated edge detection threshold should be set sufficiently low so as to ensure retention of important edges, as the subsequent processing to be described will ensure rejection of unreliable edges.

As mentioned above, the term "image" as used herein is intended to be broadly construed, and in the context of the edge image $I_{edge}$ may comprise, for example, an edge map or other set of pixel information characterizing detected edges. The term "edge" is also intended to be broadly construed, so as to encompass, for example, a set of pixels in a given image that are associated with a transition between part of a periphery of an imaged object and other portions of the image.

In step 212, redundant edges are rejected. As the edge detection operation applied in step 210 tends to identify a significant number of less important or spurious edges, these and other redundant edges are rejected in step 212. This may involve, for example, comparing the first and second sets of edges corresponding to respective edge images $I_{CE}$ and $I_{edge}$, and rejecting one or more edges that are determined to be redundant based on the comparison.

The term "redundant edge" in this context is intended to be broadly construed, and should not be viewed as limited to edges that are present in both the first and second sets of edges corresponding to respective edge images $I_{CE}$ and $I_{edge}$. Accordingly, a redundant edge in the context of step 212 may be, for example, an edge that is present in the edge image $I_{edge}$ but does not correspond to any particular cluster edge in the edge image $I_{CE}$.

Other criteria may additionally or alternatively be used to reject edges in one or both of the edge images $I_{CE}$ and $I_{edge}$. For example, certain edges in one or both of these edge images may be optionally rejected as being of insufficient size.

The output of the edge rejection step 212 is the edge image $I_{TE}$ having reliable or "true" edges, as indicated by block 202-3. The edge image $I_{TE}$ is an example of the above-noted third set of edges, and is determined based on the first and second set of edges corresponding to respective edge images $I_{CE}$ and $I_{edge}$.

Figure 5:
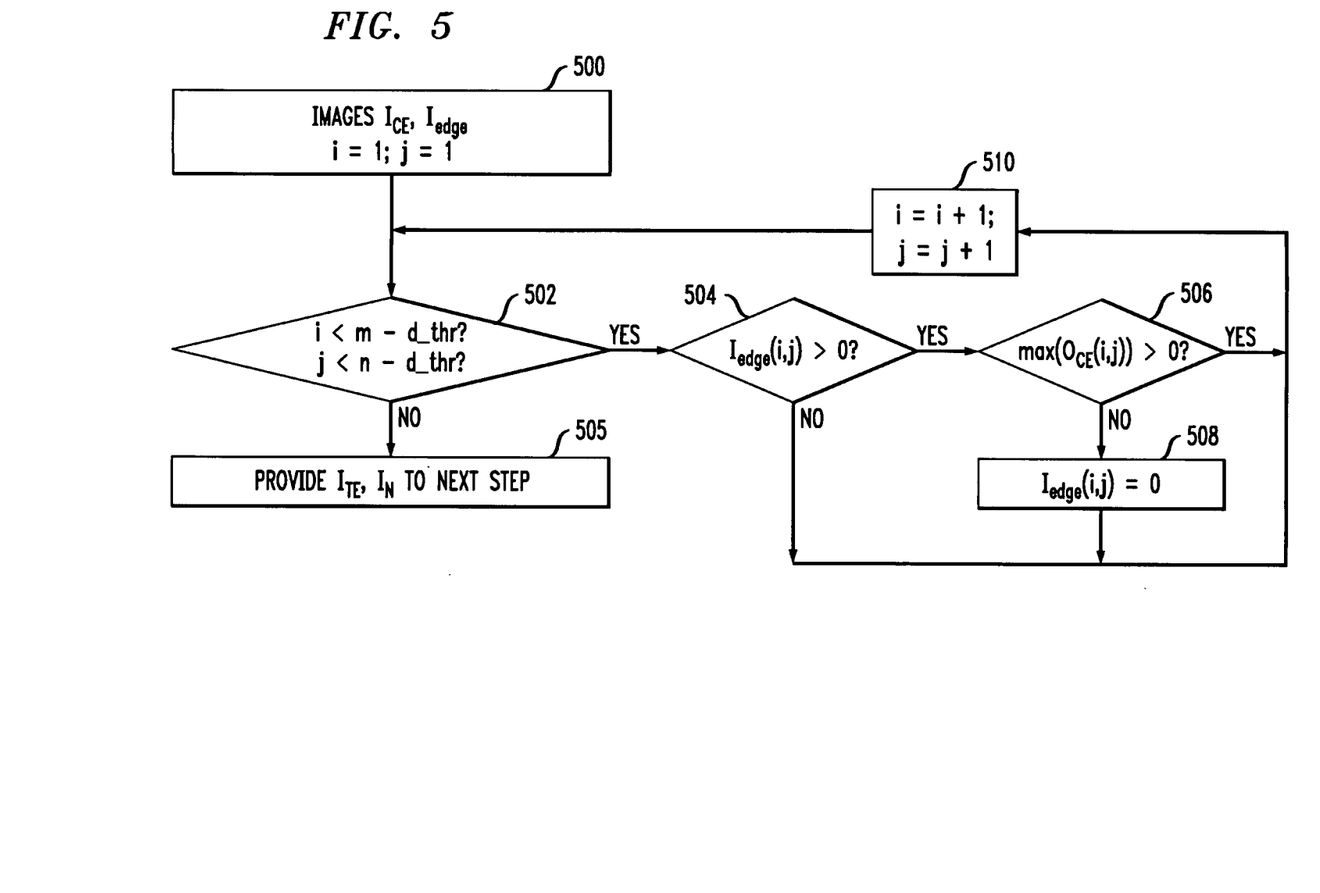

An exemplary edge rejection process for use in step 212 is illustrated in FIG. 5. This process is generally configured to retain only those edges in $I_{edge}$ that lie near cluster edges in $I_{CE}$. The process receives as its inputs the edge images $I_{CE}$ and $I_{edge}$ and initializes image pixel indices i and j in step 500. Step 502 compares the current values of the indices i and j to the image dimensions m and n as reduced by a predefined threshold d_thr. The threshold d_thr more particularly denotes a radius of a vicinity $O_{CE}(i,j)$ in edge image $I_{CE}$ that is centered on pixel (i,j). Accordingly, the vicinity defines a set of pixels of edge image $I_{CE}$ having Euclidean distance of less than d_thr from the pixel (i,j). An exemplary value for d_thr in the present embodiment is 15, although other values can be used.

Step 504 determines if the pixel $I_{edge}(i,j)$ is non-zero, and if it is, step 506 determines if the corresponding vicinity $O_{CE}(i,j)$ in edge image $I_{CE}$ has at least one non-zero pixel. If it does, the non-zero pixel $I_{edge}(i,j)$ is near a cluster edge in $I_{CE}$ and is retained, and step 510 increments i and j after which the process returns to step 502. Otherwise, the non-zero pixel $I_{edge}(i,j)$ is not near a cluster edge in $I_{CE}$ and therefore is rejected by setting it to zero in step 508, after which step 510 increments i and j and the process returns to step 502. Also, if the pixel $I_{edge}(i,j)$ is determined to be zero rather than non-zero in step 504, step 510 increments i and j and the process returns to step 502.

Although not specifically shown in FIG. 5, edge image $I_{TE}$ is assumed to be initialized to edge image $I_{edge}$ at the start of the process, and to be updated along with $I_{edge}$ as required to remove pixels associated with rejected edges in step 508. Finally, step 505 indicates that the edge rejection process is complete, and that edge images $I_{TE}$ and $I_{edge}$ are made available for the next step of the FIG. 2 process. The updated $I_{edge}$ and the corresponding true edge image $I_{TE}$ will contain only those edges of the original $I_{edge}$ that are reliable in the sense of being part of the defined vicinity of a cluster edge from $I_{CE}$.

In steps 214 and 216, separate and distinct filtering operations are applied to different portions of the image. More particularly, portions of the input image $I_N$ other than portions associated with the true edges in edge image $I_{TE}$ are subject to low-pass filtering in step 214, and special filtering is applied to the portions associated with the true edges in edge image $I_{TE}$ in step 216. The resulting output is the denoised image $I_A$ with well-defined edges as indicated in box 204.

Figure 6:
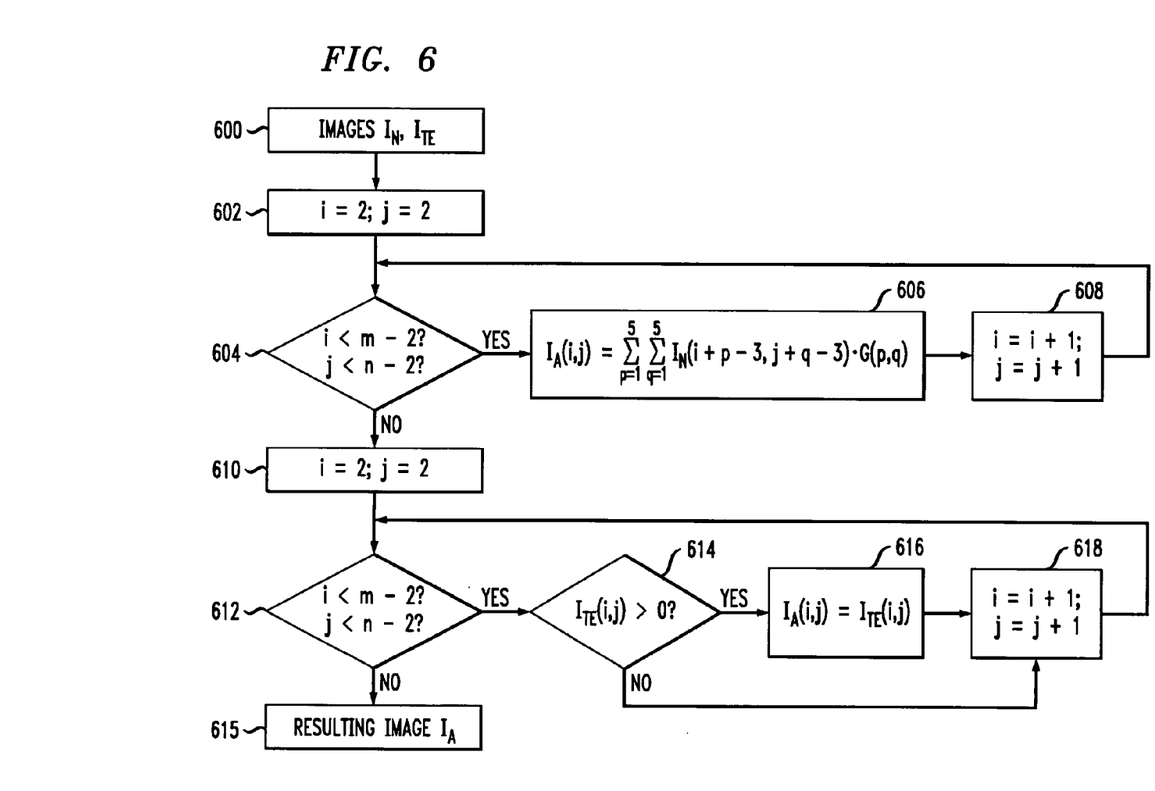

The low-pass filtering applied in step 214 is illustrated in FIG. 6, and by way of example includes Gaussian smoothing with sigma=0.66 and Gaussian approximation size=5. The input to the FIG. 6 process comprises images $I_N$ and $I_{TE}$ as indicated in block 600. Steps 602, 604, 606 and 608 implement substantially the same low-pass filtering as previously applied to the entire input image $I_N$ prior to clustering, as described in conjunction with steps 300 through 306 of FIG. 3 in the context of the low-pass filtering of step 205. Also, steps 610, 612, 614, 615, 616 and 618 are configured to insert non-zero edge pixels corresponding to the true edges of edge image $I_{TE}$ into the same pixel positions in the denoised image $I_A$.

The special filtering applied to edge pixels using true edge vicinities in step 216 is not explicitly illustrated in FIG. 5 but may be implemented as follows. For every edge pixel (i,j) a designated number Q of neighborhood pixels $p_1, \ldots, p_Q$ is determined. Neighborhood pixels in this example are defined as all pixels with coordinates (k,l), such that i−4<k<i+4, j−4<l<j+4, although other neighborhood definitions can be used. Let $P_1, \ldots, P_Q$ be values associated with the respective pixels $p_1, \ldots, p_Q$. The values in the present embodiment are assumed to comprise depth values or other depth information for respective pixels of a depth map or other depth image, but in other embodiments may comprise other types of information, such as intensity values for respective pixels of an intensity image. The special filtering changes the value of edge pixel (i,j) to $$\frac{P_1 + \ldots + P_Q}{Q}$$

for all possible (i,j) if Q≠0. If Q=0 for the current pixel, its value is set to 0, since if the current pixel has no neighbors along the edge, it is assumed that it was mistakenly attributed to the edge.

Numerous other types of special filtering can be applied to the edge pixels prior to their insertion into the denoised image $I_A$ in other embodiments. For example, the value of edge pixel (i,j) can instead be set equal to the median of the values $P_1, \ldots, P_Q$ of the respective neighborhood pixels $p_1, \ldots, p_Q$.

The term "vicinity" as used herein is intended to be more broadly construed than the exemplary neighborhoods described in conjunction with the previous examples. A wide variety of different techniques may be used to select and weight vicinity pixels for use in filtering edge portions of an image, and a particular one of these techniques may be determined for use in a given application by taking into account factors such as computational complexity and desired edge quality.

It is to be appreciated that the particular process steps used in the flow diagrams of FIGS. 2 through 6 are exemplary only, and other embodiments can utilize different types and arrangements of image processing operations. For example, the particular manner in which reliable edges are identified, and the particular manner in which separate and distinct filtering operations are applied to edge and non-edge portions of an image can be varied in other embodiments. Also, as noted above, steps indicated as being performed serially in the figure can be performed at least in part in parallel with one or more other steps in other embodiments. Accordingly, various operations in one or more of these processes can be pipelined in a straightforward manner.

Figure 7:
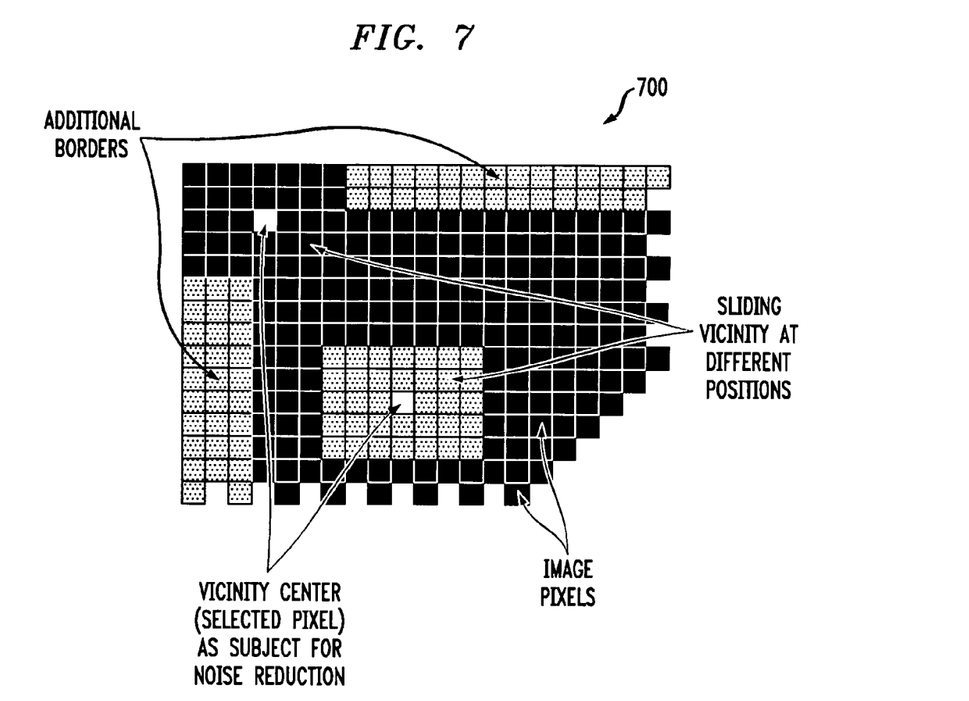
FIG. 7 shows a portion of an image illustrating sliding vicinities in another exemplary process for edge-preserving noise suppression using the image processor of the FIG. 1 system.

It is also possible in one or more alternative embodiments to avoid the application of separate low-pass filtering to the non-edge portions of the input image $I_N$. An embodiment of this type will now be described with reference to FIG. 7. The process in this embodiment includes the following steps, which are applied in place of the filtering steps 214 and 216 of the FIG. 2 process:

1. Scan pixels of the input image $I_N$. Sequential or parallel scanning may be used, and the particular scan sequence used does not alter the result.

2. For each pixel, define a rectangular vicinity bounded by current pixel±vicinity_width pixels horizontally and current point±vicinity_height pixels vertically. In the particular image portion shown in FIG. 7, the vicinity is defined by parameters vicinity_width=3 and vicinity_height=2, although other values can be used. Two different vicinities for two different selected current pixels are illustrated in FIG. 7. The vicinities for different current pixels are also referred to as "sliding vicinities" at different positions in the image. The image borders can be processed uniformly using vicinity_width pixels or vicinity_height pixels at each side as indicated in the figure.

3. If the vicinity defined above for a current pixel includes an edge pixel, mask out the edge pixel and all pixels that are farther than the edge pixel from the vicinity center. This excludes "foreign" pixels from consideration.

4. If the current pixel at the vicinity center falls outside of a brightness range of other remaining vicinity pixels, the current pixel is considered a local outlier and is marked to be later set to the nearest value from that range.

5. Apply all postponed pixel value changes. This part of the process can be implemented using two sets of memory locations, one set storing the image and the other set storing the mask. Only the mask is being changed while sliding and considering different vicinity positions. If the mask has a zero in a given position, no change will be made to this position in the image, and otherwise a new value from the mask will overwrite the old value in the same position in the image.

6. After the entire image has been scanned and the necessary changes applied, in the case at least one pixel was changed, the process may be repeated. For practical low-resolution depth images, about 15 to 20 iterations will typically suffice to perform all possible changes, as the number of corrected pixels falls almost exponentially. A maximal number of iterations step_max can be specified (e.g., step_max=10).

The above-described edge-preserving noise suppression processes provide enhanced image quality relative to conventional techniques, particularly for low-resolution images such as depth images from an SL camera or ToF camera. Image quality is improved relative to conventional techniques in terms of measures such as SNR and PSNR, as well as other measures such as the R figure of merit described in the above-cited Pratt reference. This facilitates the implementation of subsequent image processing operations that involve processing of edge information, including, for example, feature extraction, pattern identification, gesture recognition, object recognition and tracking.

It should again be emphasized that the embodiments of the invention as described herein are intended to be illustrative only. For example, other embodiments of the invention can be implemented utilizing a wide variety of different types and arrangements of image processing circuitry, modules and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method executable by at least one processor coupled to a memory, comprising:
applying a clustering operation to an image to identify one or more clusters;
identifying a first set of edges as one or more edges of the one or more clusters;
applying an edge detection operation to the image to identify a second set of edges;
identifying a third set of edges based on the first and second sets of edges, wherein the third set of images includes at least one of a subset of the first set of edges or a subset of the second set of edges;
applying a first type of filtering operation to portions of the image associated with the third set of edges; and
applying a second type of filtering operation to one or more other portions of the image.

2. The method of claim 1, wherein the image comprises a depth image generated by a depth imager.

3. The method of claim 1, further comprising applying a low-pass filtering operation to the image prior to applying the clustering operation.

4. The method of claim 1, wherein identifying the third set of edges comprises comparing the first and second sets of edges and rejecting one or more edges that are determined to be redundant edges based on the comparing.

5. The method of claim 1, wherein identifying at least one of the first, second, or third sets of edges in the image further comprises generating one or more edge images.

6. The method of claim 1, wherein the first type of filtering operation is configured to alter a value of a given edge pixel as a function of a designated number Q of neighborhood pixels $p_1, \ldots, p_Q$.

7. The method of claim 6, wherein the value of the given edge pixel is changed to $$\frac{P_1 + \ldots + P_Q}{Q}$$

if $Q \neq 0$ and is set to zero if $Q=0$, where $P_1, \ldots, P_Q$ denote the respective values of the neighborhood pixels $p_1, \ldots, p_Q$.

8. The method of claim 6, wherein the value of the given edge pixel is changed to a median of values $P_1, \ldots, P_Q$ of the respective neighborhood pixels $p_1, \ldots, p_Q$.

9. The method of claim 1, wherein the second type of filtering operation comprises a Gaussian smoothing operation.

10. The method of claim 1, wherein the clustering operation applied to the image comprises a clustering operation based on statistical region merging that separates the image into a plurality of clusters, wherein each cluster corresponds to a different statistical region.

11. The method of claim 10, wherein the clustering operation based on statistical region merging implements recursive merging using a specified merging predicate for two arbitrary statistical regions $R_1$ and $R_2$ of the image, in accordance with the following equation:

$$P(R_1, R_2) = \begin{cases} \text{true}, & \text{if } |R_1 - R_2| \leq \sqrt{b^2(R_1) + b^2(R_2)} \\ \text{false}, & \text{otherwise} \end{cases}$$

where $|R_1-R_2|$ denotes the magnitude of the difference between the number of pixels in region $R_1$ and the number of pixels in region $R_2$, and $b(R_1)$ is a function of the number of pixels in region $R_1$ and a maximum possible value of a pixel in the image, such that regions $R_1$ and $R_2$ are merged into a single cluster if $P(R_1,R_2)$=true.

12. An apparatus, comprising:
at least one processor coupled to a memory;
wherein the said at least one processor is configured to execute program instructions configured to cause the at least one processor to:
apply a clustering operation to an image to identify one or more clusters;
identify a first set of edges as one or more edges of the one or more clusters;
applying an edge detection operation to the image to identify a second set of edges;
identify a third set of edges based on the first and second sets of edges, wherein the third set of images includes at least one of a subset of the first set of edges or a subset of the second set of edges,
apply a first type of filtering operation to portions of the image associated with the third set of edges, and apply a second type of filtering operation to one or more other portions of the image.

13. The apparatus of claim 12, wherein the at least one processor comprises an image processor.

14. The apparatus of claim 13, wherein the image processor comprises:
a clustering module configured to identify a plurality of clusters in the image with edges of the clusters being identified as a first set of edges; and
an edge detection module configured to identify a second set of edges in the image;
wherein a third set of edges is identified based on the first and second sets of edges; and
wherein the first type of filtering operation is applied to portions of the image associated with one or more edges of the third set of edges.

15. The apparatus of claim 13, wherein the image processor comprises a filtering module configured to separately apply the first and second filtering operations to the corresponding portions of the image.

16. An image processing system, comprising:
An imager providing an image; and
an image processor coupled to the imager, wherein the image processor is configured to execute program instructions configured to cause the image processor to:
apply a clustering operation to an image to identify one or more clusters;
identify a first set of edges as one or more edges of the one or more clusters;
applying an edge detection operation to the image to identify a second set of edges;
identify a third set of edges based on the first and second sets of edges, wherein the third set of images includes at least one of a subset of the first set of edges or a subset of the second set of edges,
apply a first type of filtering operation to portions of the image associated with the third set of edges, and
apply a second type of filtering operation to one or more other portions of the image.

17. The image processing system of claim 16, wherein the imager comprises:
at least one of a two-dimensional imager or a three-dimensional imager.

18. The image processing system of claim 16, wherein the imager comprises:
at least one of a structured light camera or a time of flight camera.

19. The image processing system of claim 16, wherein the identify a third set of edges comprises:
compare the first and second sets of edges, and
reject one or more edges that are determined to be redundant edges based on the comparison.

20. The image processing system of claim 16, wherein the clustering operation applied to the image comprises a clustering operation based on statistical region merging that separates the image into a plurality of clusters, wherein each cluster corresponds to a different statistical region.

* * * * *